United States Patent [19]

Omoda et al.

[11] Patent Number: 4,758,975

[45] Date of Patent: Jul. 19, 1988

[54] DATA PROCESSOR CAPABLE OF PROCESSING FLOATING POINT DATA WITH EXPONENT PART OF FIXED OR VARIABLE LENGTH

[75] Inventors: Koichiro Omoda, Sagamihara; Mitsuru Nagasaka, Kokubunji, both of Japan

[73] Assignee: Hitachi, Ltd., Tokyo, Japan

[21] Appl. No.: 807,683

[22] Filed: Dec. 11, 1985

[30] Foreign Application Priority Data

Dec. 14, 1984 [JP] Japan .................. 59-264270

[51] Int. Cl.⁴ .................. G06F 7/38; H03M 7/00
[52] U.S. Cl. .................. 364/748; 364/736; 340/347 DD
[58] Field of Search .................. 364/736, 748; 340/347 DD; 235/310, 311

[56] References Cited

U.S. PATENT DOCUMENTS

| | | | |
|---|---|---|---|
| 3,829,673 | 8/1974 | Bouton, Jr. et al. | 364/748 |
| 4,553,130 | 11/1985 | Kato | 340/347 DD |
| 4,570,056 | 2/1986 | Hanson | 235/311 |
| 4,603,323 | 7/1986 | Hassitt et al. | 364/748 |
| 4,617,641 | 10/1986 | Hamada | 364/748 |
| 4,631,696 | 12/1986 | Sakamoto | 364/748 |
| 4,675,809 | 6/1987 | Omoda et al. | 364/748 |

OTHER PUBLICATIONS

Hamada, "Internal Representations for Numeric Data", Comm. of Infor. Processing, Society of Japan, vol. 24, No. 4, Apr. 1983, pp. 353-357.
Morris, "Tapered Floating Pt.: A New Floating Pt. Representation", IEEE Trans. on Computers, Dec. 1971.
MATSUI et al., "An Overflow/Underflow Free Floating Pt. Representation of Nos.", J. of Infor. Processing, vol. 4, No. 3, 1981, pp. 123-133.
Hamada, "Universal Representation of Real Numbers in Digital EKG", Bit, vol. 14, No. 4, Mar. 1982, pp. 53-59.
HAMADA, "Not-a-number on New Representation of Real Nos. & Relations Between the Representation & Programming Language", Proc. of the 25th Conf. of Info. Processing, Society of Japan, IL-9, Oct. 1982, pp. 1169-1170.
HAMADA, "Data Length Independent Real No. Representation Based of Double Exponentiaal Cut II", J. of Info. Processing Society of Japan, vol. 24, No. 2, Mar. 1983, pp. 149-156.
HAMADA, "A Representation of Real Numbers Instead of Floating Pt. Representation", Proc. of the 23rd Conf. of Info. Processing Society of Japan, Oct. 1981, pp. 151-152.
HAMADA, "Data Length Independent Real No. Representation Based on Exponential Cut", J. of Info. Processing Society of Japan, vol. 22, No. 6, Nov. 1981, pp. 521-526.
HAMADA, "Representation of Real Nos. Instead of Fl. Pt. Representation", Proc. of Symposium in Research Institute of Mathematical Science of University of Kyoto, Nov. 1981.
HALE et al., "Biased and Non-Biased Binary Conversion and Exponent Under/Overflow Detection", IBM Technical Disclosure Bulletin, vol. 23, No. 1, Jun. 1980.

*Primary Examiner*—Gary V. Harkcom
*Assistant Examiner*—Long Thanh Nguyen
*Attorney, Agent, or Firm*—Antonelli, Terry & Wands

[57] ABSTRACT

A data processor for latching in a floating point register floating point data having exponent parts of fixed and variable lengths, which are transferred from a main storage or an arithmetic unit as they are, but are not converted to another data expression type. When the data of the two representation types are to be input for computations from the floating point register or storage to the arithmetic unit, there is provided circuitry for controlling the data to be computed after that data has been converted into data having an exponent part of fixed length representation, in the arithmetic case of data having an exponent part of the variable length representation, and data to be computed without any data conversion in the arithmetic case of data having an exponent part of the fixed length representation. By thus controlling the two computations discriminatively, it is possible to realize the processing time periods matching the respective data widths.

8 Claims, 6 Drawing Sheets

DATA PROCESSOR CAPABLE OF PROCESSING FLOATING POINT DATA WITH EXPONENT PART OF FIXED OR VARIABLE LENGTH

BACKGROUND OF THE INVENTION

The present invention relates to a data processor for efficiently computing floating point data which is represented to have exponent parts of both variable and fixed lengths.

Floating point data representation is one which is frequently used in scientific and technical computations because it can handle large or small numbers with equal accuracy.

Since, however, the floating point data representation has its exponentially represented part (which will hereafter be referred to as an "exponent part") fixed, it is disadvantages in that its expressable range is limited and that it lacks flexibility to enhance the accuracy of a mantissa even when the exponent has such a small value that it requires very little information.

Therefore, for an example of a method of representing and a system for computing such flexible floating point data as has an exponent part of variable length so that it can express even a remarkably large or small number while representing a numerical value near 1 with high accuracy (Reference should be made to: Reports of Data Processing Association, Vol. 24, No. 2 (in March 1983), entitled "Data Length Independent Real Number Representation Based on Double Exponential Cut II"; and Japanese Patent Laid-Open No. 59-11444, entitled "System for Computing Floating Point Data", and U.S. Pat. application No. 543,426, now U.S. Pat. No. 4,671,641 corresponding to the latter.)

Figure 2:
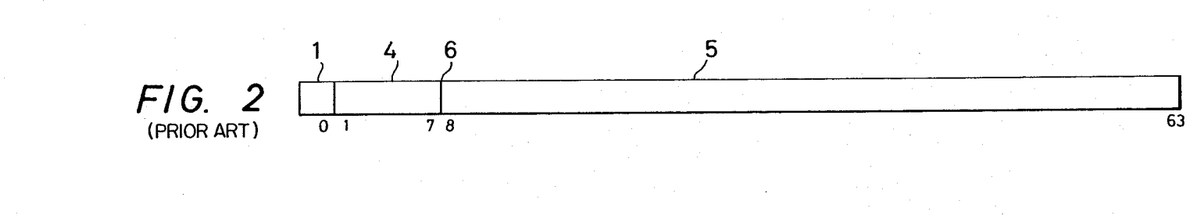
FIG. 2, is a diagram showing an example of the format of the floating point data having an exponent part of fixed length of the prior art to be used in the processor of FIG. 1.

FIG. 2 is a diagram showing an example of the format of a floating point data of 64 bits having an exponent part of fixed length according to the prior art.

In FIG. 2, reference numeral 1 indicates a sign part indicating the sign of a mantissa part 3 to discriminate whether the floating point number is positive or negative. Numerals 4 and 5 indicate an exponent part and the mantissa part, respectively. In case a number x is positive, more specifically, it is represented by $x = 2^e \cdot f$ with an exponent e and a mantissa f.

The sign part 1 is composed of 1 bit; the exponent part is composed of 7 bits and expresses an exponent by using the twos complement; and mantissa part 5 is composed of 56 bits and expresses a mantissa with the twos complement. Here the highest bit of the mantissa part is normally shifted out. The numeral 6 indicates the separation point of the exponent part 4 and the mantissa part 5.

Figure 3A:
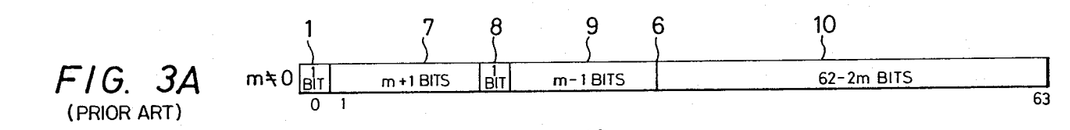
FIGS. 3A and 3B are diagrams showing examples of floating point data having an exponent part of variable length representation of the prior art to be used in the processor of FIG. 1.
Figure 3B:
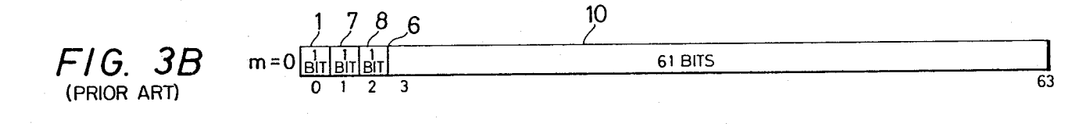

As shown in FIGS. 2 and 3, the floating point representation of the prior art has its separating point 6 of the exponent part 4 and the mantissa part 5 fixed. As a result, the arithmetic of four operations, i.e., the addition, subtraction, multiplication and division in the floating point representation having an exponent part of fixed length of the prior art has the respective number of bits of the exponent part 4 and the mantissa part 5 fixed so that their control is relatively simple.

FIGS. 3A and 3B are diagrams showing the respective formats of examples of the aforementioned floating point data of 64 bits having an exponent part of variable length of the prior art in cases where a later-described parameter m is 0 as well as when it is not 0.

In FIGS. 3A and 3B: numeral 1 indicates a sign part; numeral 6 a separating part; numeral 7 a first (or front half of) exponent part; numeral 8 an exponent part separating part; numeral 9 a second (or rear half of) exponent part; and numeral 10 a mantissa part.

As shown in FIGS. 3A and 3B, in the variable length representation of the exponent part, the total number of the bits of the sign part 1, the exponent parts 7, 8 and 9 and the mantissa part 10 is fixed, but the respective bit lengths of the exponent parts 7, 8 and 9 and the mantissa part 10 are variable in that limited range. In other words, the separating point 6 between the exponent parts 7, 8 and 9 and the mantissa part 10 is movable. As has been described hereinbefore, therefore, the variable length representation of the exponent part can have an enlargement of the range of representable numbers and flexibility in the accuracy representation, but the arithmetic control is more complicated than the case of the fixed length representation of the exponent part.

Since substantially all scientific and technical programs developed in the prior art are based upon data having an exponent part of fixed length, it is necessary that they execute arithmetic of data having an exponent part of not only fixed length but also variable length. In order to satisfy this requirement, there has been applied for patent by the present assignee U.S. patent application No. 666,748, now U.S. Pat. No. 4,675,809, in which is disclosed a data processor having the following problems. Specifically, data having an exponent part of fixed length representation and data having an exponent part of variable length representation are latched in such a form in a floating point register that they are converted into data having a common exponent part of fixed length. In a data processor for multi-programming, therefore, the common data having an exponent part of fixed length representation has to be inversely converted and released in a memory when the content of a floating point register is to be released.

Moreover, the data having an exponent part of fixed length representation are converted into common data having an exponent part of the fixed length representation so that they are enlarged to have an intrinsically unnecessary data width. This is because in the data having an exponent of the variable length representation the exponent part and the mantissa part have variable bit widths so that a rather large data width has to be retained. This raises a problem in that the data width of the exponent part is greatly enlarged to increase the time period for arithmetic processing.

In the description to be made, the exponent part of fixed length representation, the data having an exponent part of fixed length, the exponent part of variable length representation, and the data having an exponent part of variable length will be hereafter be referred to as "fixed length representation", "data having fixed length", "variable length representation" and "data having variable length", respectively.

SUMMARY OF THE INVENTION

An object of the present invention is to solve those problems of the prior art and to provide a data processor capable of efficiently processing floating point data having both variable and fixed lengths.

A data processor of the present invention latches in a floating point register floating point data having exponent parts of fixed and variable lengths, which are transferred from a main storage or an arithmetic unit, as they are but are not converted into another data expression type. When the data of the two representation types are to be input for computations from the floating point register or the storage to the arithmetic unit, there is provided means for controlling the data to be computed after having been converted into data having an exponent part of fixed length representation, in the arithmetic case of data having an exponent part of variable length representation, and data to be computed without any data conversion in the arithmetic case of data having an exponent part of fixed length representation. By thus controlling two computations discriminatively, it is possible to realize the processing time periods matching the respective data widths.

DESCRIPTION OF THE PREFERRED EMBODIMENT

Figure 1:
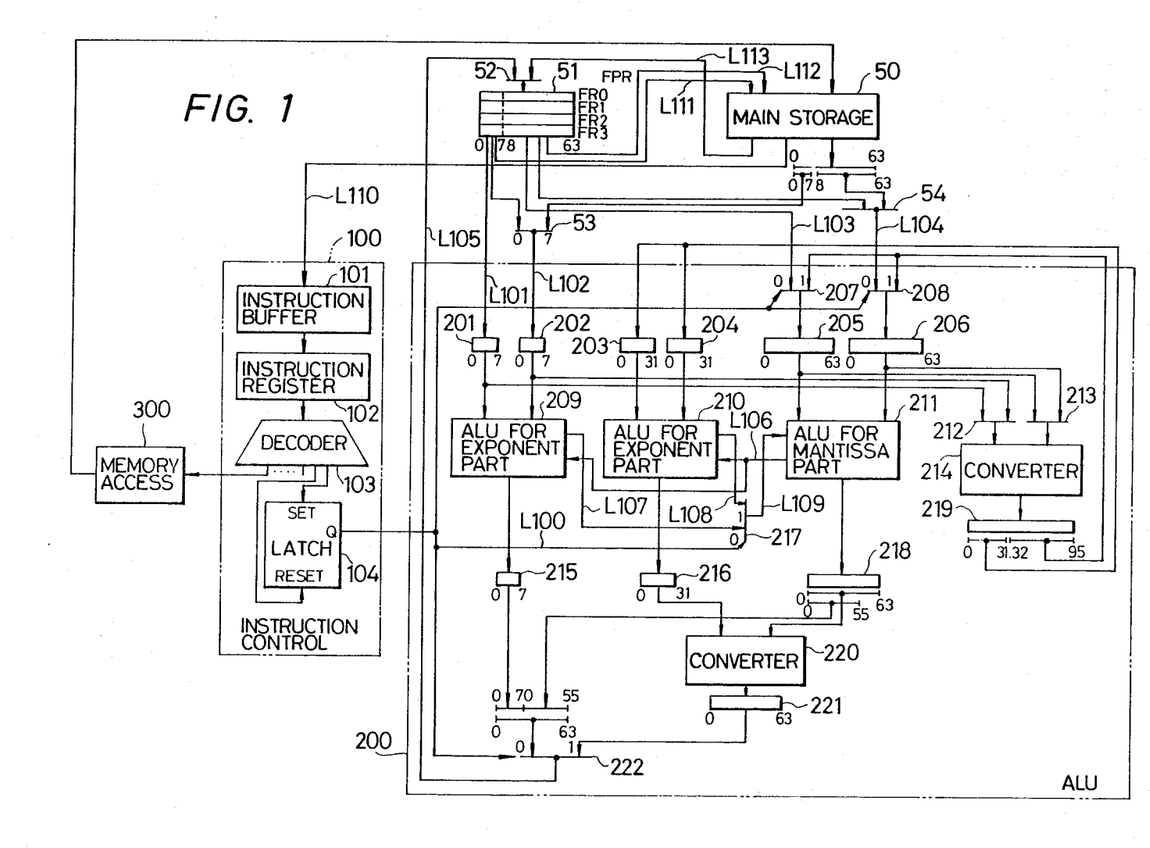
FIG. 1 is a block diagram showing the construction of the data processor according to one embodiment of the present invention.

FIG. 1 is a block diagram showing the construction of the data processor according to one embodiment of the present invention.

In FIG. 1: reference numeral 50 indicates a main storage; numeral 51 a floating point register composed of four register components FR$_0$ to FR$_3$; numeral 100 an instruction control; numeral 101 an instruction buffer; numeral 102 an instruction register; numeral 103 a decoder; numeral 104 an arithmetic mode latch; numeral 200 an arithmetic logic unit for floating point numbers; numerals 201 to 206, 215, 216, 218, 219 and 221 registers; numerals 52 to 54, 207, 208, 212, 213, 217 and 222 selectors; 209 and 210 arithmetic logic units for exponent parts; numeral 211 an arithmetic logic unit for mantissa parts; and numerals 214 and 220 converters.

The data representation to be used in the present embodiment uses, as the data of fixed length representation, double precision data of fixed length representation (having a data length of 64 bits) shown in FIG. 2 and double precision data of variable length representation of the prior art (having a data length of 64 bits) shown in FIG. 3A or 3B. These two data items are stored in a mixed form in not only the main storage 50 but the floating point register 51.

When the data of fixed length representation is to be read out for arithmetic from the floating point register 51 or the main storage 50, it is computed by the use of the exponent part arithmetic logic unit 209 and the mantissa part arithmetic logic unit 211, and the arithmetic result is stored in the floating point register 51.

When the data of variable length representation is to be read out for arithmetic from the floating point register 51 or the main storage 50 to the floating point arithmetic logic unit 200, it is temporarily converted to data of fixed length representation by the converter 214 and is then computed by the exponent part arithmetic logic unit 210 and the mantissa part arithmetic logic unit 211, and the data of fixed length expression obtained as the arithmetic result is stored in the floating point register 51 after it has been converted to the data of variable length by the converter 220.

Before entering into the detailed description of the embodiment of the present invention, the variable length expression according to the prior art will be first described in more detail in the following.

The variable length representation shown by way of example in FIGS. 3A and 3B is characterized in that the length of the exponent part is determined in terms of the leading "0" or "1" column (which corresponds to the first exponent part 7 shown in FIGS. 3A and 3B) of the exponent part. According to this format, numerical values near 1 which appear frequently can have the mantissa part elongated while having the exponent part shortened so that they can be represented more accurately than the fixed length representation of the prior art. Moreover, even such large or small numbers as could not be represented in the prior art can be represented because they can have elongated exponent parts.

Now assuming that a number to be expressed is designated as x, the number x is expressed in the following manner by using two numbers e and f:

$$x = 2^e \cdot f \quad (1)$$

Here, the following conditions are established to determine unique values for e and f:

(i) x > 0:

$$e: \text{Integer} \quad (2);$$

$$1 \leq f < 2 \quad (3);$$

and $$f = 1 \cdot f_1 f_2 \ldots f_j \ldots \quad (4).$$

In the above Equation (4), the term $f_1 f_2 \ldots f_j \ldots$ is assumed to be the bit pattern of the mantissa part. The mantissa parts in the fixed length representation and in the common representation used in the following embodiment are also to have the same pattern.

(a) For e > 0, the number e has a range which can be expressed as follows with m binary digits (where m > 0):

$$2^{m-1} \leq e < 2^m - 1 \quad (5).$$

The above inequalities are expressed in terms of the range of the number x, as follows, including the range of the number f of the inequalities (3):

$$2^{2^{m-1}} \leq x < 2^{2^m} \quad (6).$$

(b) For e < 0, the range of the number x is expressed by the following inequalities:

$$2^{-2m} \leq x < 2^{-2m-1} \quad (7)$$

The above inqualities (7) are expressed in terms of the range of the number e by the following inequalities:

$$-2^m \leq e < -2^{m-1} \quad (8)$$

From the above inequalities, the mantissa f is expressed in the following manner, considering the number e as the two's complement:
For $x < 0$;

$$-2 \leq f < -1 \quad (3')$$

The foregoing inequalities (5) and (8) fail to include the cases $e=0$ and $e=-1$ but are interpreted for $m=0$. Involving those, the integer e is internally expressed in the following manner when it is expressed in m binary digits:

$$\text{For } e \geq 0: \\ \underbrace{0 \ldots 0}\ 1\ \underbrace{e_{m-1} \ldots e_2\ e_1}; \\ \text{and} \\ \text{for } e < 0: \\ \underbrace{1 \ldots 1}\ 0\ \underbrace{e_{m-1} \ldots e_2\ e_1} \quad (9)$$

Here, since the number e is expressed in m binary digits, the exponent part is constructed from the predetermined columns of m and $e_{m-1} \ldots e_2\ e_1$ by adding the recognizing bit columns of m to the left:

$$\text{For } e \geq 0: \\ \underbrace{m+1}_{a}\ \underbrace{1 \ldots 1\ 0}_{b}\ \underbrace{e_{m-1} \ldots e_2\ e_1}_{c}; \\ \text{and} \\ \text{For } e < 0: \\ \underbrace{m+1}_{a}\ \underbrace{0 \ldots 0\ 1}_{b}\ \underbrace{e_{m-1} \ldots e_2\ e_1}_{c} \quad (10)$$

The order of magnitude of the bit columns of equation (10) as the sign or the fixed point binary number is coincident to that of the number e. The order of magnitude of the number x is coincident to that of the number e even if its mantissa part is taken into consideration.

(ii) $x < 0$:
In this case, too, the range of the number of x is determined substantially like the aforementioned case (i) in place of the above inequalities (6), as follows (for $e > 0$):

$$-2^{2m} \leq x < -2^{2m-1} \quad (6')$$

In place of the foregoing inequalities (7), moreover, the range of the number x is expressed by the following inequalities (for $e < 0$):

$$-2^{-2m-1} \leq x < -2^{-2m} \quad (7')$$

For $x < 0$, the order of the Formula (10) may be inverted considering that the orders of the numbers x and e are inverse, but this inversion can be achieved by using the ones complement. Hence, the Formula (10) can be transformed into the following one:

$$\text{For } e \geq 0: \\ \underbrace{m+1}_{a}\ \underbrace{0 \ldots 0\ 1}_{b}\ \underbrace{e_{m-1} \ldots e_2\ e_1}_{c}; \\ \text{and} \\ \text{For } e < 0: \\ \underbrace{m+1}_{a}\ \underbrace{1 \ldots 1\ 0}_{b}\ \underbrace{\overline{e_{m-1}} \ldots \overline{e_2}\ \overline{e_1}}_{c} \quad (10')$$

In the above Formula (10'), the overscored numbers such as $\bar{e}$ designate the inversion of 0 and 1 of each bit.

The circled letters a, b and c appearing in the above Formulas (10) and (10') correspond to the first exponent parts 7, the exponent part separating parts 8 and the second exponent parts 9 shown in FIGS. 3A and 3B, respectively.

Figure 4:
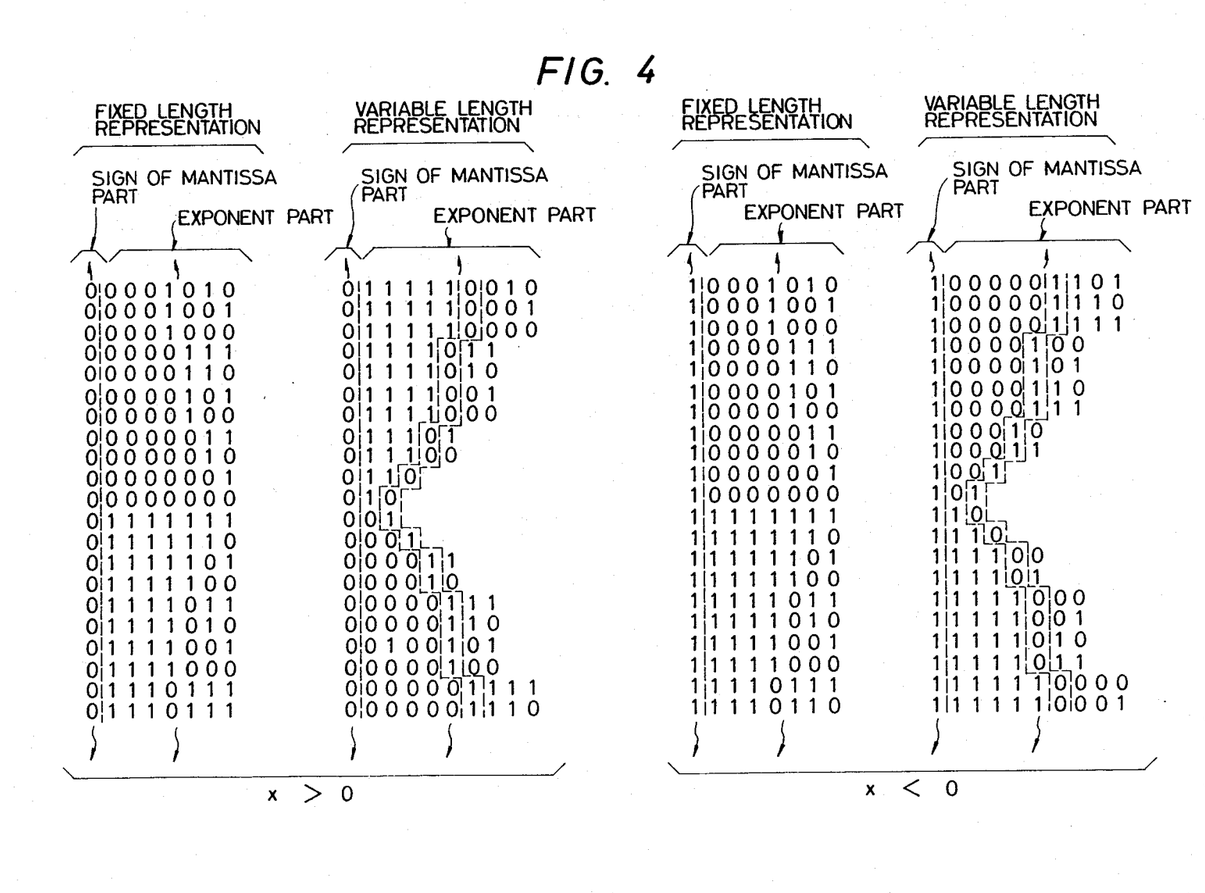
FIG. 4 is a diagram showing corresponding examples of the exponent parts of the data of the variable length representation shown in FIG. 3A or 3B and the fixed length representation shown in FIG. 2.

FIG. 4 is a diagram showing corresponding examples of the exponent parts of the variable length representation to be used in the present invention and the fixed length representation of the prior art.

As is apparent from FIG. 4, in the variable length representation, next to the sign of the mantissa part, it is possible to discriminate, from the preceding 0 or 1 column, the inequalities of $e \geq 0$ for $x \geq 0$, $e < 0$ for $x \geq 0$, $e \geq 0$ for $x < 0$, and $e < 0$ for $x < 0$, and the m figures of the lengths of the exponent part separating part and the second exponent part.

The embodiment will be described more specifically in the following.

The fixed length data, which is obtained by converting the variable length data by the action of the converter 214, and its representation will be hereafter referred to as the "expanded fixed length data" and the "expanded fixed length representation", respectively.

Figure 5:
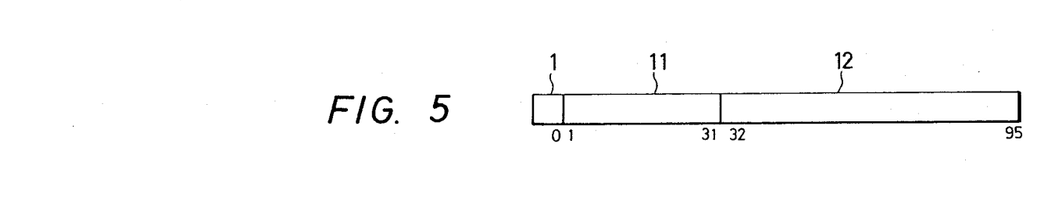
FIG. 5 is a diagram showing the format of the data of expanded fixed length representation to be used in the present invention.

FIG. 5 is a diagram showing the format of the data of expanded fixed length representation to be used in the present invention.

In FIG. 5: reference numeral 1 indicates a sign part of 1 bit; numeral 11 an exponent part of 31 bits; and numeral 12 a mantissa part of 64 bits. The mantissa part 12 may have 61 bits at most but is normally in byte units of 8 bits so as to have 64 bits.

If the double precision data shown in FIG. 3A or 3B is used as the data of variable length representation, the mantissa part has a maximum bit length of 61 bits. Moreover, the maximum number of bits the exponent part when it is represented in the expanded fixed length is set here at 31 bits. This is the value (i.e., 31 bits), at which the number of bits the mantissa part takes the value 0 after it has decreased with the increase in the number of bits in the exponent part, and can represent data of sufficiently wide range. In fact, the range of representable data can be further expanded. More specifically, the range is expanded to become wider by increasing the first exponent 7 shown in FIG. 3A or 3B, when the number of bits in the mantissa part takes the value 0, and by accordingly decreasing the second exponent part 9.

Now, the processings of FIG. 1 will be described specifically.

(1) Reading the Data from the main storage 50 to the Floating Point Register 51:

For this reading operation, the known load instructions are used. When the load instructions are set in the instruction register 102 and are decoded by the decoder 103, a memory access circuit 300 responds to the instructions to generate the address of the main storage 50 thereby to access the same so that the data having the addresses designated by those instructions is fed via a line L113 and the selector 52 to the floating point register 51. The register components $FR_i$ (wherein i=1 to 4) in the floating point register 51 to store the data are also designated by those instructions. In the present embodiment, the load instructions to be used have a common instruction code for the variable length data and for the fixed length data.

(2) Storage of the Data from the Floating Point Register 51 in the Main Storage 50

For this storing operation, the known store instructions are used. Data is read out from the register $F_j$ (wherein j=1 to 4) in the floating point register 51, which is designated by those instructions, by the memory access circuit 300 and is written in such an address in the main storage 50 through lines L111 and L112 as is designated by those instructions. The store instructions to be used in the present embodiment have a common instruction code for variable length data and for fixed length data.

(3) Set/Reset of Arithmetic Mode Latch

In FIG. 1, the discrimination of the arithmetic of the fixed length data and the arithmetic of the variable length data is conducted by the arithmetic mode latch 104 in the instruction control 100. The fixed length data arithmetic is specified when the arithmetic mode latch 104 is at the value "0" whereas variable length data arithmetic is specified when the latch 104 is set to "1". The arithmetic mode latch 104 is reset to "0", when the reset instruction is decoded by the decoder 103, and is set to "1" when the set instruction is decoded by the decoder 103. Because of the many fixed length operations in normal arithmetic, the arithmetic mode latch is usually held at "0", and the set and reset instructions are provided before and after the arithmetic of the variable length data, respectively. Then, the arithmetic mode latch is set to "1" only before the arithmetic is conducted, and is reset again to "0" after the end of the arithmetic. Thus, no change is required in such a program for executing the fixed length data arithmetic as is used in the prior art, and an identical arithmetic instruction can be shared between the arithmetic of the fixed length data and the arithmetic of the variable length data.

(4) Data Arithmetic

The instructions for designating the data arithmetic are roughly divided into two. The first is the instruction for reading out first and second data from the two registers $FR_i$ and $FR_j$ in the floating point register 51 to designate that the arithmetic result be stored in the register $FR_i$. The second is the instruction for reading out the first data from one register $FR_j$ in the floating point register 51 and the second data from a certain address of the main storage 50 to designate that the arithmetic result be stored in the register $FR_j$. The selectors 53 and 54 respond to the first instruction to select the bits 0 to 7 and the bits 8 to 63 of the second data read out from the register $FR_j$ and respond to the second instruction to select bits 0 to 7 and bits 8 to 63 of the second data read out from the main storage 50.

These operations of the selectors 53 and 54 are controlled by the decoder 103.

The selectors 207, 208, 217 and 222 have their operations controlled by the output of the arithmetic mode latch 104. The values "0" and "1" on the input lines of those selectors indicate that those input lines are selected when the outputs of the mode latch 104 take the values "0" and "1", respectively.

(i) Arithmetic of Fixed Length Data

At this time, the arithmetic mode latch 104 is set in advance in the reset state. The bits 0 to 7 (i.e., the sign part and the exponent part) of the first data are set in the register 201 from the floating point register 51 through a signal line L101, and the bits 8 to 63 (i.e., the mantissa part) of the first data are set in the register 205 through a signal line L103 and the selector 207. Next, the bits 0 to 7 (i.e., the sign part and the exponent part) of the second data read out from the floating point register 51 or the main storage 50 are set in the register 202 through the selector 53 and a line L102, and the bits 8 to 63 (i.e., the mantissa part) of the second data are set in the register 206 through the selector 54, a signal line L104 and the selector 208. Since the mantissa part has 56 bits, the all "0" is added to the 8 bits of the lower figures, and the registers 205 and 206 are set from the left. The exponent part arithmetic logic unit 209 conducts the arithmetic of the respective sign and exponent parts of the first and second data in the registers 201 and 202, and the mantissa part arithmetic logic unit 211 conducts the arithmetic of the respective mantissa parts of the first and second parts in the registers 205 and 206.

At this time, the control information is transferred between the two arithmetic logic units 209 and 211. For example, the control information such as the number of bits to be shifted in the mantissa part for the figure arrangement of the exponent part in the addition and subtraction is transferred to the mantissa part arithmetic logic unit 211 from the exponent part arithmetic logic unit 209 through a signal line L107, the selector 217 and a signal line L109, whereas the control information such as the post number of bits to shift i.e., the number of bits to be shifted for normalizing the mantissa part, of the mantissa part in addition and subtraction is transferred to the exponent part arithmetic logic unit 209 from the mantissa part arithmetic logic unit 211 through a signal line L106. The arithmetic results from the two arithmetic logic units 209 and 211 are set in the registers 215 and 218, respectively, and are transferred to the floating point register 51 through the selector 222, a signal line L105 and the selector 52. Of the mantissa part of 64 bits set in the register 218, the upper 56 bits are selected and delivered to the selector 222.

(ii) Arithmetic of Variable Length Data

Like the case of the fixed length data, bits 0 to 7 of the first and second data are set in the registers 201 and 202, and bits 8 to 63 of the first and second data are set in the registers 205 and 206. The first data set in the registers 201 and 205 is input to the converter 214 through the selectors 212 and 213, respectively, and converted from the variable length data to the expanded fixed length data and set in the register 219. Bits 0 to 31 (i.e., the sign part and the exponent part) of the expanded fixed length data are set in the register 203, and the bits 32 to 95 (i.e., the mantissa part) are set in the register 205 through the selector 207. Subsequently, the second data set in the registers 202 and 206 is input like the previous operation to the converter 214 through the selector 213 so that they are converted to the expanded fixed length data, until the sign part and the exponent part are set in the register 204 whereas the mantissa part is set in the register 206 through the selector 208.

The conversions in the converter 214 will be described with reference to FIG. 6.

Figure 6:
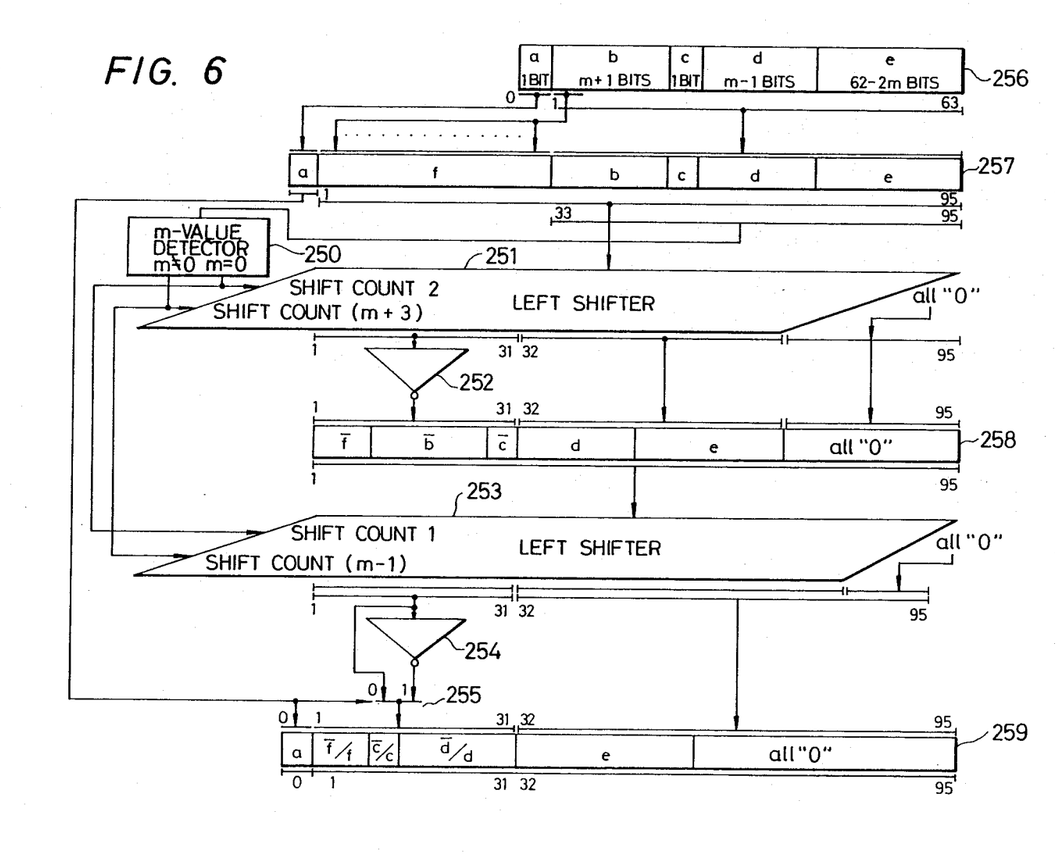
FIG. 6 is a diagram showing a converter for converting the data of variable length of FIG. 1 to the data of expanded fixed length.

In FIG. 6: reference numeral 250 indicates an m-value detector (wherein the letter m is shown in FIGS. 3A and 3B); numerals 251 and 253 left shifters; numerals 252 and 254 inverters; numeral 255 a selector; and numerals 256 to 259 registers. The variable length data stored in the register 256 is composed of: a sign part a (of 1 bit); a first exponent part b (of (m+1) bits); an exponent part separating part c (of 1 bit); a second exponent part d (of (m−1) bits); and a mantissa part e (of (62−2m) bits). The data thus composed is transferred as it is as the content of the register 257, and a constant bit f is supplemented between the sign part a and the first exponent part b so that the data has 95 bits. Next, the parts b, c, d and e are input to the m-value detector 250 to detect the value m, and the shift counts 2 and (m+3) are transferred to the left shifter 251 for m=0 and for m≠0, respectively. The data stored in the register 257 is input to the left shifter 251 to be shifted to the left by the shift count number so that the data shifted is set in the register 258.

In this case, the upper bits of the sign part a and the part f are eliminated whereas the parts f, b and c are inverted and set through the inverter 252, and the value all "0" is supplemented to the lower surplus part.

Moreover, the data stored in the register 258 is inputted to the left shifter 253 so that it is shifted to the left by the shift count 1 for m=0 (wherein m designates the value detected by the m-value detector 250) and by the shift count (m−1) for m≠0. The upper part of the shift result is eliminated whereas the sign part a is transferred as it is from the register 257, and the parts of f̄/f, c̄/c and d̄/d are prepared from the parts f, c and d through the inverter 254 and set in the register 259. The mantissa part e is set as it is in the register 259, and the lower surplus part is supplemented by the value all zeroes.

Further, the m-value detector 250 counts the number of the successive values of all ones or all zeroes. This counting method can be simply realized by making use of a logic structure to count the number of the successive values of all zeroes from the highest bit of the mantissa part in the normalizing processing of the floating point arithmetic logic unit of the prior art, for example.

FIG. 6 shows one example of the operations of converting variable length data to expanded fixed length data, which can be replaced by another method having the identical function.

Thus, the sign part and the exponent part, which are converted to the expanded fixed length data and set in the registers 203 and 204 of FIG. 1, are input to the exponent part arithmetic logic unit 210, whereas the mantissa part set in the registers 205 and 206 is input to the mantissa part arithmetic logic unit 211 so that they are respectively computed.

At this time, the same control information as that in the arithmetic case of the fixed length data is transferred from the exponent part arithmetic logic unit 210 to the mantissa unit arithmetic logic unit 211 through a signal line L108, the selector 217 and the signal line L109, and the control information is transferred from the mantissa part arithmetic logic unit 211 to the exponent part arithmetic logic unit 210 through the signal line L106.

The exponent part and the mantissa part, which are obtained as a result of the arithmetic in the two arithmetic logic units 210 and 211, are input to the converter 220 through the registers 216 and 218, respectively, and are converted from expanded fixed length data to the variable length data until the 64 bits of the variable length data converted are transferred to the floating point register 51 through the register 221, the selectors 222 and 52 and the line L105.

One example of the converting operations of the converter 220 will be described with reference to FIG. 7.

Figure 7:
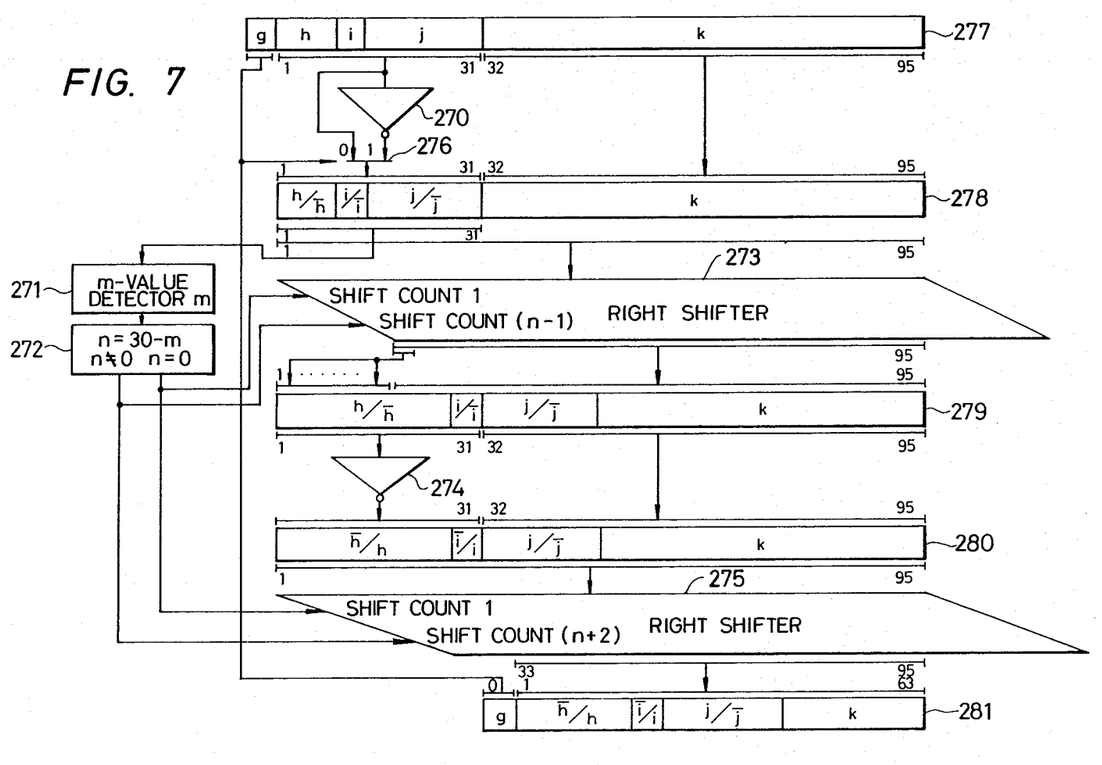
FIG. 7 is a diagram showing a converter for converting the data of expanded fixed length to the data of variable length.

In FIG. 7: reference numerals 270 and 274 indicate inverters; numeral 271 an m-value detector; numeral 272 a computing circuit of "n=30 −m"; numerals 273 and 275 right shifters; numeral 276 a selector; and numerals 277 to 281 registers.

The expanded fixed length data stored in the register 277 is composed of a sign part g, exponent parts h, i and j, and a mantissa part k, of which the exponent parts h, i and j are converted through the inverter 270 to h̄/h, i/ī and j/j̄ and set in the register 278. The exponent part and the mantissa part stored in the register 278 are input to the right shifter 273, and the exponent part is input to the m-value detector 271 and subsequently to the computing circuit 272 of "n−30−m". The data input to the right shifter 273 is shifted to the right by the shift count 1 for n=0 and by the shift count of (n−1) for n≠0 as a result of the computation of the computing circuit 272 of "n=30−m" so that the result is set in the register 279. A constant bit value is added to the higher part of the data set in the register 279, and a constant bit of the lower part is discarded and set in the register 280. At this time, only the first exponent part h/h̄ is inverted to h̄/h by the inverter 274. The data stored in the register 280 is input again to the right shifter 275 so that it is shifted to the right by the shift count 1 for n=0 and by the shift count of (n+2) for n≠0. The shifted result is set in the register 281. At this time, the sign part g is delivered as it is from the register 277, and the surplus lower part of the mantissa part k is eliminated to leave 64 bits.

FIG. 7 shows one example of operation of converting the expanded fixed length data to the variable length data, which example can be replaced by another method having a similar function.

Moreover, the common functions of FIGS. 6 and 7 may be shared. For example, if the shifters 251, 253, 273 and 275 are made to have shifting functions to both the right and left and are used in common, the number of the shifters to be used can be reduced.

Still moreover, the two kinds of exponent part arithmetic logic units 209 and 210 having widths of 8 bits and 32 bits are used in FIG. 1, but can be reduced to one by commonly using the arithmetic logic unit having a width of 32 bits. In this case, however, the time required for the arithmetic is increased because the 32-bit width arithmetic is performed for the 8-bit width arithmetic.

Figure 8:
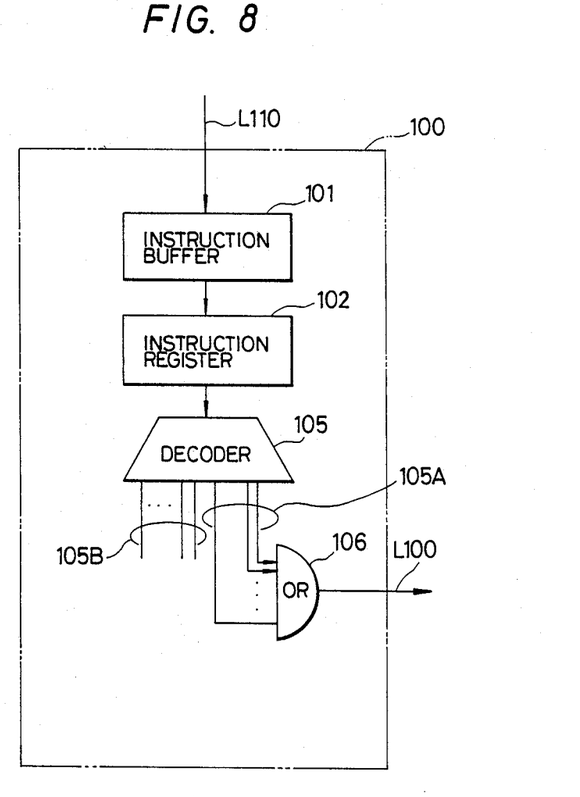
FIG. 8 is a diagram showing another example of the construction of an instruction control 100.

FIG. 8 shows another embodiment of the instruction control 100 shown in FIG. 1. In this Figure: reference numeral 101 indicates an instruction buffer; numeral 102 an instruction register; numeral 105 a decoder for decoding an instruction; and numeral 106 an OR circuit. In FIG. 1, the arithmetic mode latch 104 discriminates the arithmetic of both fixed and variable length exponent parts and uses the instruction commonly, but FIG. 8 corresponds to the case in which individual arithmetic instructions are provided for the two kinds of arithmetic. Of two items of decoding information 105A and 105B of the decoder 105, the decoding information 105A of various instructions for designating the arithmetic instruction of the exponent part of variable length is taken to have a logic "OR" by the OR circuit 106 so that the result is output to a signal line L100. In FIG. 1, more specifically, the arithmetic mode latch 104 is eliminated and has its output replaced by the output of the OR circuit 106 of FIG. 8 so that the two types of arithmetic may be discriminated.

As has been described hereinbefore, the data processor of the present invention can process both the floating point data having exponent parts of variable and fixed lengths and is enabled to simplify the escape and-/or restoration of the floating point registers, which are required when the processor is subjected to multi-programming control, by not converting the two floating point data to data of another representation but latching them in the floating point registers. If the variable length data and the fixed length data are made to have the identical length as in the present embodiment, moreover, there can be attained an advantage that the load and store instructions can be shared between the two floating point data. By controlling the arithmetic operations of addition, subtraction, multiplication and division of the two floating point data separately as in the present embodiment, it is possible to retain a processing time period matching the data widths of the exponent part and mantissa part of the two floating point data (wherein the data having the exponent part of variable length is converted to the data having the exponent part of expanded fixed length before it is processed). When one group of arithmetic instructions are used commonly to discriminate in the arithmetic mode as in the first embodiment when the two floating point data are to be processed by separate controls, furthermore, there can be attained another effect that the number of arithmetic instructions can be reduced.

What is claimed is:

1. A data processor comprising:
   a main storage for holding floating point data signals each having an exponent part of fixed length and floating point data signals each having an exponent part of variable length;
   a plurality of floating point registers, connected to said main storage and being designated by instructions, each for holding a floating point data signal having an exponent part of either fixed length or variable length;
   first arithmetic means connected to said floating point registers for performing a floating point operation on an applied first floating point data signal of fixed length and for providing a second floating point data signal having an exponent part of fixed length and corresponding to the result of the operation on said first floating point data signal performed in said first arithmetic means;
   first conversion means connected to said floating point registers for converting an applied third floating point data signal having an exponent part of variable length into a corresponding fourth floating point data signal having an exponent part of fixed length and representing essentially the same number as the third floating point data signal;
   second arithmetic means connected to said first converting means for performing a floating point operation on the fourth floating point data signal and for providing a fifth floating point data signal having an exponent part of fixed length and corresponding to the result of the operation on said fourth floating point data signal performed in said second arithmetic means;
   second conversion means connected to said second arithmetic means for converting the fifth floating point data signal into a corresponding sixth floating point data signal having an exponent part of variable length and representing essentially the same number as the fifth floating point data signal; and
   control means connected to said floating point registers, said first and second conversion means and said first and second arithmetic means and responsive to instructions for selectively performing a first control operation to read and provide a floating point data signal having an exponent part of fixed length from one of said floating point registers designated by a first instruction to said first arithmetic means as the first floating point data signal and to write the second floating point data signal provided by the first arithmetic means into one of said floating point registers designated by the first instruction, and a second control operation to read and provide a floating point data signal having an exponent of variable length from one of said floating point registers designated by a second instruction to said first conversion means as the third floating point data signal and to write the sixth floating point data signal provided from said second conversion means into one of said floating point registers designated by the second instruction.

2. A data processor according to claim 7, wherein said control means includes:
   mode designating means responsive to a third instruction for selectively designating a first mode or a second mode; and
   means connected to said mode designating means for conducting said first and second control operations in response to the designations on said first and second modes, respectively.

3. A data processor according to claim 2, wherein each of the third and sixth floating point data signal has a series of bits of "0" or a series of bits of "1" in a front part of the exponent part thereof, and the length of the front part is proportional to a rear part of the exponent part thereof, which comprises a series of bits representing value of exponent represented by the third or sixth floating point data signal.

4. A data processor according to claim 1, wherein said control means includes means for conducting said first and second control operations in response to the first and second instructions, said first and second instructions being predetermined different instructions requesting operations on floating point data signals having exponent parts of fixed and variable length, respectively.

5. A data processor according to claim 4, wherein each of the third and sixth floating point data signal has a series of bits of "0" or a series of bits of "1" in a front part of the exponent part thereof, and the length of the front part is proportional to a rear part of the exponent part thereof, which comprises a series of bits representing value of an exponent represented by the third or sixth floating point data signal.

6. A data processor according to claim 1, wherein the exponent part and a mantissa part of each of the fourth and fifth floating point data signals respectively provided from said first conversion means and said second arithmetic means are longer than the exponent part and a mantissa part of each of the first, second, third and sixth floating point data signals.

7. A data processor according to claim 1, further comprising mantissa part aithmetic means connected to said floating point registers and said first conversion means for selectively receiving a mantissa part of the first and fourth floating point data signals and for performing an operation on the mantissa part of the received floating point data signal;

said first arithmetic means including first exponent part arithmetic means connected to said floating point registers and said mantissa part arithmetic means for performing an operation on the exponent part of the first floating point data signal, and said second arithmetic means including second exponent part arithmetic means connected to said first conversion means and said mantissa part arithmetic means for performing an operation on the exponent part of the fourth floating point data signal.

8. A data processor according to claim 1, wherein each of the third and sixth floating point data signals has a series of bits of "0" or a series of bits of "1" in a front part of the exponent part thereof, and the length of the front part is proportional to a rear part of the exponent part thereof, which comprises a series of bits representing the value of an exponent represented by the third or sixth floating point data signal.

* * * * *